(12) United States Patent
Toro

(10) Patent No.: US 7,396,602 B2
(45) Date of Patent: Jul. 8, 2008

(54) ELECTROCHEMICAL GENERATOR AND METHOD FOR ITS UTILISATION

(75) Inventor: Antonino Toro, Segrate (IT)

(73) Assignee: Nuvera Fuel Cells Europe S.R.L., Milan (IT)

( * ) Notice: Subject to any disclaimer, the term of this patent is extended or adjusted under 35 U.S.C. 154(b) by 350 days.

(21) Appl. No.: 10/536,561

(22) PCT Filed: Dec. 15, 2003

(86) PCT No.: PCT/EP03/14264

§ 371 (c)(1),
(2), (4) Date: May 25, 2005

(87) PCT Pub. No.: WO2004/055926

PCT Pub. Date: Jul. 1, 2004

(65) Prior Publication Data

US 2006/0154117 A1    Jul. 13, 2006

(30) Foreign Application Priority Data

Dec. 16, 2002  (IT) .......................... MI2002A2637

(51) Int. Cl.
*H01M 8/00* (2006.01)
*H01M 8/04* (2006.01)
*H01M 2/00* (2006.01)

(52) U.S. Cl. ............................. 429/13; 429/26; 429/34
(58) Field of Classification Search .................. 429/12, 429/33, 26, 13, 34
See application file for complete search history.

(56) References Cited

U.S. PATENT DOCUMENTS

| 3,761,316 | A  | * | 9/1973  | Stedman ....................... 429/26 |
| 4,769,297 | A  |   | 9/1988  | Reiser et al. |
| 2001/0033956 | A1 |  | 10/2001 | Appleby |

FOREIGN PATENT DOCUMENTS

| EP | 0 328 115 A1 | 8/1989 |
| EP | 0 415 330 A2 | 3/1991 |
| EP | 0 415 330 A3 | 3/1991 |

* cited by examiner

*Primary Examiner*—Patrick Joseph Ryan
*Assistant Examiner*—Thomas H. Parsons
(74) *Attorney, Agent, or Firm*—Finnegan Henderson Farabow Garrett & Dunner, LLP

(57) ABSTRACT

An electrochemical generator consisting of an alternation of membrane fuel cells and cooling cells with internal circulation of liquid water is described. The fuel cells are fed in at least one of the two compartments, anodic or cathodic, with dry gas, which is humidified through the passage of water coming from the adjacent cooling cell through a metal porous separating wall. The permeated liquid water contributes to the withdrawal of the heat of reaction by evaporating at least in part inside the fuel cells.

18 Claims, 3 Drawing Sheets

ELECTROCHEMICAL GENERATOR AND METHOD FOR ITS UTILISATION

This application is a 371 of PCT EP/2003/014264 filed December 15, 2003.

The generation of direct electric current by means of fuel cells is a well known alternative to the traditional generating systems, characterised by low or zero environmental impact. Depending from the required power, several types of fuel cells exist, characterised by employing different electrolytes and as a consequence by different operating temperatures. Polymer membrane fuel cells are the best suited for small scale systems (typically below 500 kW) in which low times for the start up and for reaching the nominal power, ease of shutdown and subsequent start up and capability of instant response to variations of load request in a very wide range are required: typical fields of application for this type of cell are the automotive traction and the local production of electricity for domestic use. In their turn, polymer membrane fuel cells may be generally divided in two types, depending whether they use, as the anodic feed, a gaseous fuel (for instance hydrogen, pure or in admixture) or a liquid fuel (for instance methanol or other light alcohols). In both cases, the solid electrolyte employed, a proton-exchange membrane normally provided with sulphonic functional groups, imposes a working temperature below 100° C. or, in the best of cases, a few degrees above that threshold. In fact, protonic conduction in that type of membranes takes place by electric charge splitting on the functional groups through a dissociation mechanism, requiring the presence of moisture to occur in an efficient fashion. Cells supplied with hydrogen at the anode and with oxygen or air at the cathode (PEMFC) are even more remarkably affected by the dehydrating phenomena which tend to arise as the temperature increases, as both reactants are in the gaseous phase, and membrane hydration can take place only through the water produced by the overall reaction and the humidity of the gaseous flows. Since the electric current generation achieved by fuel oxidation and cathodic oxygen reduction occurs with the release of heat, the importance of an effective heat removal is apparent in order not to incur an undesired temperature increase which would hamper the proton conduction mechanism, often irreversibly. In a single fuel cell, the heat may be easily withdrawn by convection from the external walls; nevertheless, a single cell is hardly useful for thermodynamic reasons, since the electric voltage at its poles would result very limited, in any case lower than 1 Volt, even when generating very modest currents. Fuel cells are therefore laminated in modular arrangements usually in electric series, so that the single cell voltages are added up in a stack of the required size. A similar cell lamination makes however the heat withdrawal from the walls by atmospheric natural convection impracticable, especially as regards the cells of the central portion. For the above cited reasons, the engineering of fuel cell modules has remarkably focused over the years on setting up increasingly efficient systems for humidifying gases and for withdrawing the heat of reaction. According to a traditional type approach, the two functions are carried out separately by different hydraulic circuits: for instance, humidification may be effected by bubbling the gaseous reactants in hydration tanks, or supplying the same to a separate chamber through a semi-permeable membrane from a compartment where usually pre-heated liquid water circulates; the cooling may instead be achieved through the passage of liquid water at controlled temperature in appropriate serpentines running inside the plates which delimit each elementary cell, or in suitable chambers obtained between adjacent cells. The two functions must be controlled in a very rigid fashion and reciprocally well harmonised, in order to maintain adequate hydration conditions without condensing on the other hand an excessive amount of liquid water inside the cells. It must be avoided in fact that the gaseous reactants be hindered by the presence of liquid in reaching the reaction sites which consist of a catalyst deposit on porous electrode structures. The balance between incoming or reaction-generated water and water withdrawn from the cell by evaporation or with the exhaust flow is made even more difficult from the fact that the cells of traditional design provide predetermined passages for reactant diffusion given by the typical winding ribbed design of the bipolar plates delimiting the cells, which reactants are forced to cross in order to reach the reaction sites. The sticking of water droplets within the plate ribs may easily bring to halting the reactant feed and thus the current generation process.

A more advantageous situation, from this standpoint, occurs for more advanced cell designs wherein the gas path is not forced, but is delocalised within the whole volume of chambers containing a reticulated material which serves to establish the electric continuity between adjacent cells without determining sensible flow constraints. A design of this type is disclosed, for example, in EP 0629015. This kind of design is extremely favourable to obtain the so called evaporative cooling, that is the heat removal obtained through the evaporation of water, preferably nebulised, inside the cells, with subtraction of the relevant latent heat associated to the phase transformation. A solution of this kind is for instance described in WO 00/63992, wherein the simultaneous feed of water and gas is provided on the reticulated current collector which is present inside the cells; the consequent evaporation of at least part of the fed water contributes both to gas humidification and to heat withdrawal. Since the amount of evaporated water tends to increase as the temperature increases, the system tends to be self-regulating to a certain extent. Alternatively, the heat withdrawal by evaporation may be integrated by a convective withdrawal, as disclosed in WO 01/41241, wherein a fuel cell stack coupling the evaporative cooling of WO 00/63992 to a separate circuit which imposes the circulation of a coolant on the peripheral frame of the cells is described. An even more efficient evaporative/convective heat removal integrated system is finally disclosed in Italian Patent Application MI2002A 001338, describing a stack of fuel cells alternatively laminated with cooling cells; a flow of water is circulated in the latter and partially transferred to the adjacent fuel cells through a series of calibrated holes on the upper part thereof. Although the solutions proposed in the three last mentioned patent applications represent a considerable step forward with respect to the traditional technology which provides the complete separation of the cooling and humidification functions, the remarkable gas flow-rate involved, especially in the case of cells operating at low pressure, makes the perfect mixing of the generated vapour with the reactant gas, which is an essential condition for a good operation, sometimes problematic. In particular, the system of MI2002A 001338 might result much more efficient if the water exchange between cooling and fuel cells were not to occur in such a localised fashion, requiring a problematic redistribution of the fluids within the fuel cells, but rather in a way involving the whole reaction area. Some embodiments are known in the art providing, albeit in a completely different context, a delocalised matter exchange between cooling cells and fuel cells along the whole active surface. One interesting example is given by the porous carbon structures disclosed in U.S. 2001/0004501, which are used for a different purpose, that is for the withdrawal of the liquid water excess from fuel cells toward the cooling circuit. In this case, gases are fed pre-humidified from an auxiliary circuit, as the cell structure employed, made with forced path ribbed plates, makes a correct in situ humidification unfeasible. On the other hand, the accumulation of water within the ribs of the plates delimiting the cells may bring, as mentioned before, to the hindrance of reactant transfer toward the catalytic sites. While product water is generated, or following a possible excess of condensation during process transient conditions, the dangerous accumulation phenomena are in this case counteracted by the permeation of excess water toward the cooling circuit through thin graphite barriers. The use of porous walls for exchanging matter between fuel and cooling cells is further described in DE 10103568, wherein a passage of water vapour, alternatively in one sense or in the opposite, equilibrates the vapour pressure in the different points of the cell between a coolant of low volatility mixed with water and a pre-humidified gaseous reactant in the compartment of the adjacent fuel cell. This allows cooling a fuel cell stack by convection, with a cooling fluid different from pure water but with a contribution of the fluid itself in maintaining more or less constant humidification conditions. These constructions are apparently incompatible with an evaporative type cooling, furthermore entailing a complicated cell design and the use of graphitic materials, poorly resisting to mechanic solicitations and therefore disadvantageous for certain applications, such as automotive ones, typical of PEMFC type cells. Moreover, these kind of constructions are not capable of emancipating the cell design from the presence of an auxiliary system of prehumidification of the gaseous reactants.

It is an object of the present invention to provide an electrochemical generator comprising an alternation of polymer membrane fuel cells and cooling cells, suitable for achieving the in situ humidification of the gaseous reactants without the contribution of auxiliary circuits and with. a higher efficiency than the systems of the prior art, and in which the simultaneous withdrawal of at least part of the heat of reaction takes place by evaporative cooling.

Under a first aspect, the invention consists of an electrochemical generator comprising membrane fuel cells alternated to liquid water fed cooling cells in a modular lamination, wherein the cooling cells are separated by an adjacent fuel cell by means of a metallic integral porous wall, allowing the passage of water, at controlled pressure, from the cooling cell to the relative fuel cell along the whole surface; the cooling cells are preferably interposed between each pair of consecutive fuel cells.

Under a second aspect, the invention consists of a method of generation of direct electric current in a generator consisting of a modular lamination of membrane fuel cells and cooling cells mutually separated by a metallic integral porous wall, in which the fuel cells are fed with gaseous reactants at a certain pressure, and the cooling cells are fed with liquid water at a controlled higher pressure, so as to humidify the gaseous reactants supplied to the fuel cells or at least one of them, and to withdraw at least part of the heat of reaction. These and other aspects will be clarified by the following description, which has to be intended as exemplary and not limiting the invention, and in which reference will be made to the appended figures.

DETAILED DESCRIPTION OF THE INVENTION

Figure 1:
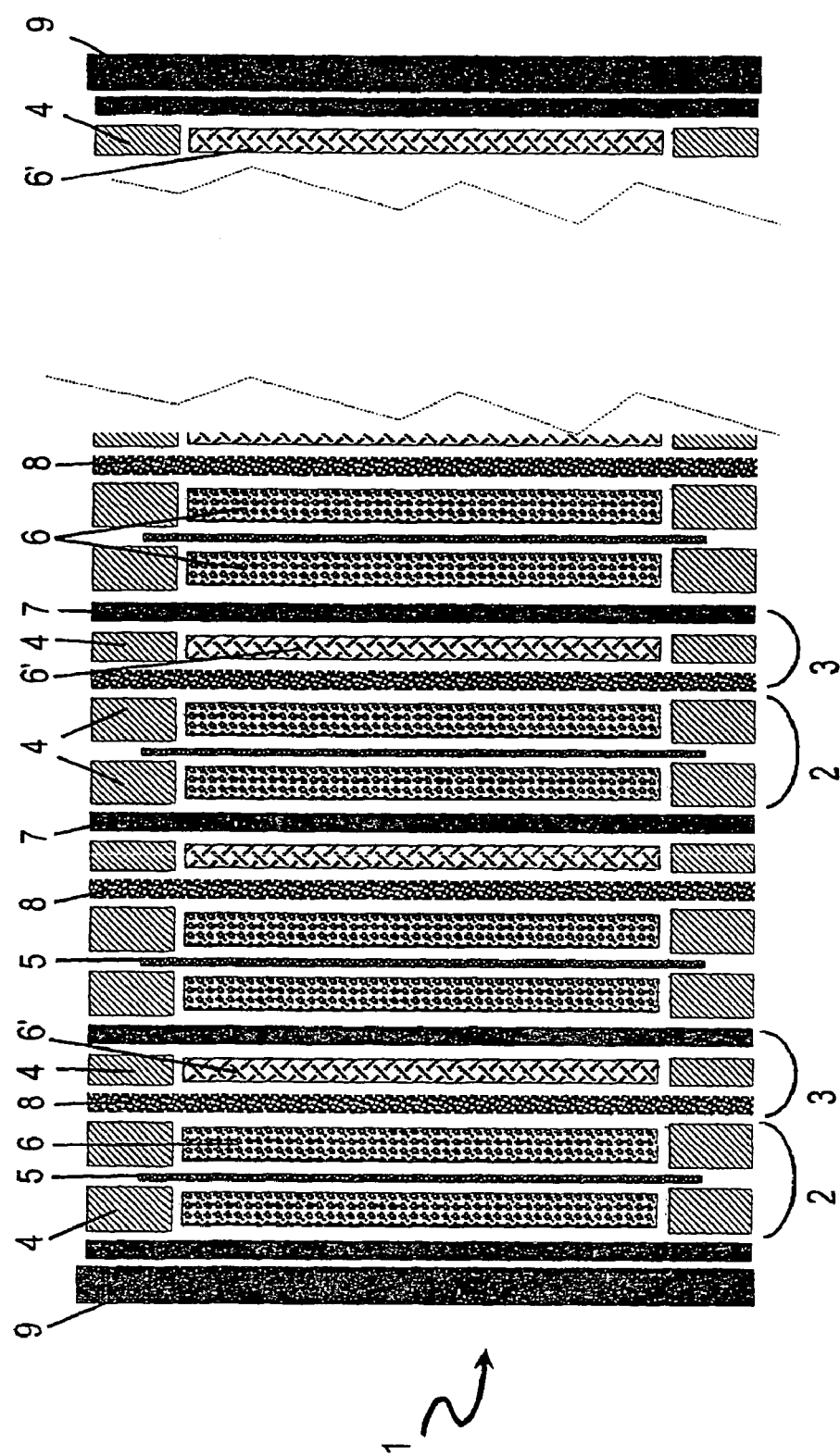
FIG. 1 shows an electrochemical generator according to a preferred embodiment of the invention.

In FIG. 1 a preferred embodiment of the invention is shown, wherein the humidification of only one of the reactants, for instance of air, is provided, and wherein (1) indicates the generator of the invention, which comprises a modular lamination, preferably according to a filter-press configuration, of fuel cells (2) and cooling cells (3). In the specific case, a cooling cell (3) is interposed for each pair of adjacent fuel cells (2). The fuel cells (2) employ an ion exchange membrane (5) as the electrolyte, preferably a polymer proton exchange membrane provided with hydrolysable functional groups. The membrane is provided on its two faces with a catalytic activation and preferably of a porous component, for example a carbon cloth, for the correct supply of the gaseous reactants to the active sites. In the illustrated case, the cell lamination provides a bipolar type electric connection, each cell being therefore delimited by bipolar elements; in particular, each fuel cell (2) and each cooling cell (3) are delimited by a bipolar plate (7) and an integral porous wall (8), both made of a metallic material. Both of the fuel cell (2) compartments are filled with a conductive reticulated distributor (6) for the gaseous reactants, which establishes also the electric continuity between the activated membrane (5) and the corresponding bipolar component, be it a plate (7) or a porous wall (8). In one preferred embodiment, also the cooling cells (3) contain a reticulated conductive material (6') for establishing internal electric continuity; such material may be the same of the distributors (6) or may be different. To better exploit the characteristics of the invention, the conductive reticulated material of the elements (6) and (6') must have a good electric and thermal conductivity, good corrosion resistance in the reaction environment and low pressure drop; particularly fit for the scope are the metallic materials, especially stainless steels and nickel alloys, in form of meshes or expanded sheets, single or superposed, or in form of sponges or foams. In order to ensure the hydraulic seal of the various components it is also possible to utilise, as shown in the figure, frame shaped planar gaskets (4), but also O-rings or other equivalent components, as known in the art. In the figure it is shown how the whole lamination making up the generator is closed by means of terminal plates (9) even though, as evident, other types of manufacturing solution may be equivalently employed. The tightening of the generator may be effected with tie-rods, or with metal belts, or other means for retention not shown in figure; the gas and cooling water feeds are generally realised through appropriate manifolds, as known in the art. As previously mentioned, the solution proposed in the figure provides that only one reactant be hydrated by the method of the invention; in fact, for a wide range of process conditions, when operating with reticulated gas distributors, which don't impose forced paths to the reactants, it is possible to operate with humidified air and dry fuel without incurring particular problems provided the air humidification is made in a correct and efficient way. In this case, the air is fed, without any prehumidification, to the fuel cells (2) through a feed device not shown in the figure in correspondence of the reticulated distributor (6) adjacent to a porous wall (8), while the fuel is supplied to the other compartment, wherein the reticulated distributor (6) is adjacent to a bipolar plate (7). The humidification water, preferably preheated so that it has a higher vapour tension, is fed to the cooling cells (3), in the present case in correspondence of the reticulated material (6'). By taking the measure of feeding the humidification water at a certain pressure, in any case higher than the reactant to be humidified opposite the porous wall (8), part of the water passes to the respective fuel cell (2), evaporating at least in part in a very homogeneous fashion, both because distributed through the integral porous wall (8) along the whole cell active area, and because favoured by the presence of the reticulated distributor (6), in accordance to the disclosure of WO 00163992. In this way, the heat of reaction will be withdrawn to a substantial extent by the local evaporation of water on the reticulated distributor (6), and only in part through the convective thermal exchange with the adjacent fuel cells achieved by the passage of circulating water in the cooling cells (3). It is however apparent that, in electrochemical generators whose process conditions impose the humidification of both gases, it will be sufficient to delimit the cooling cells (3) with two integral porous walls (8) instead of a porous wall (8) and a bipolar plate (7), so as to subdivide the passage of water toward both of the adjacent cells. Other embodiments are also possible, in which each cooling cell (3), delimited by two porous walls (8), faces the two cathodic compartments of the adjacent fuel cells (1), while the two anodic compartments, in the opposite position, are delimited by plates (7); the filter-press connection of fuel cells subdivided in pairs whose cathodic compartments face each other is less straightforward than the case of alternate compartments, but is widely known in the art.

Figure 2:
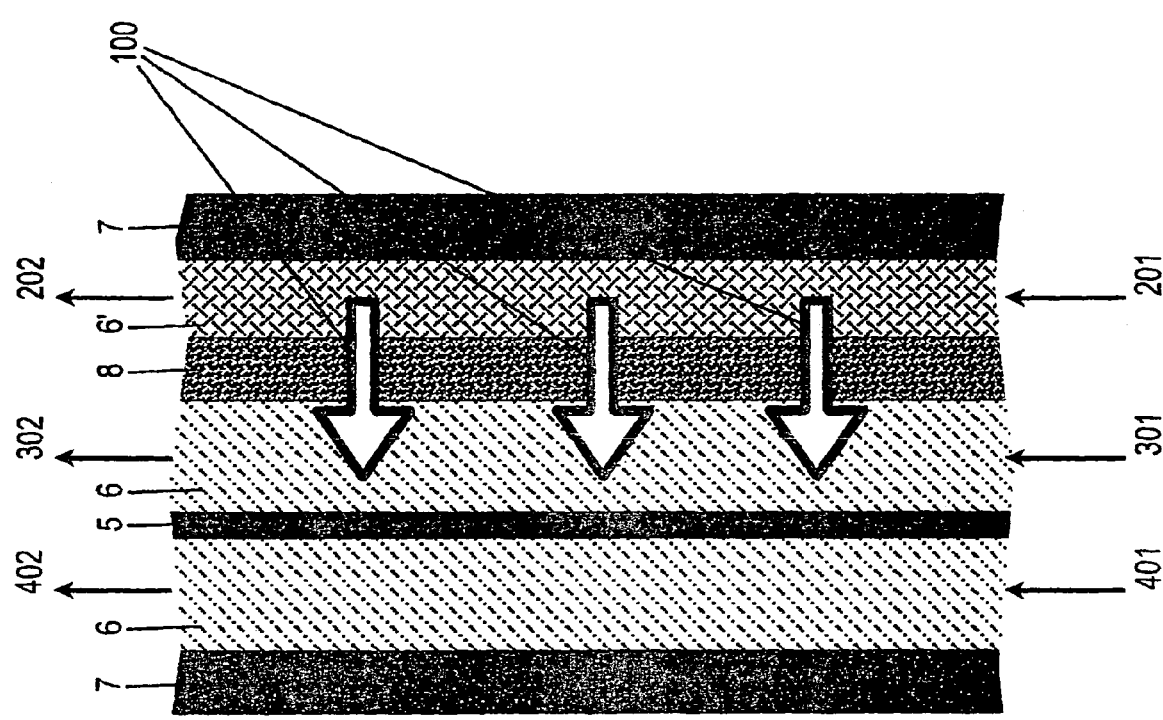
FIG. 2 shows a detail of the electrochemical generator of FIG. 1.

FIG. 2 shows a detail of the generator of FIG. 1, in which the passages of the different fluids inside the cells are better evidenced. The optionally preheated water feed inside the reticulated material (6') is indicated with (201), and the relevant outlet with (202); the feed of the reactant to be humidified (for instance air) through the reticulated distributor (6) is indicated with (301), and the relevant outlet with (302); the feed and outlet of the other reactant, for instance a hydrogen-containing fuel, are indicated with (401) and (402). Arrows (100) indicate the passage of pressurised liquid water through the porous wall (8) which separates the cooling cell from the fuel cell compartment containing the reactant to be humidified; when the water reaches the reticulated distributor (6), it evaporates to a substantial extent contributing to withdraw the heat generated by the reaction in correspondence of the activated membrane (5). To maintain a correct thermal and water balance, the amount of water crossing the porous wall (8) in the direction of arrows (100) must be regulated with some accuracy, even though the reticulated distributor (6) allows operating up to a certain limit with some liquid water excess, which would not be permitted by a forced distribution such as the one accomplished by the winding ribbed plates common to many embodiments. Such regulation is possible by acting on the porosity of the wall (8), which may be fine tuned when using adequate materials, and simultaneously on the pressure of the water with respect to that of the reactant to be humidified, opposite the wall (8). In this way, variations in the operating conditions of the generator, and thus in the heat produced, may be easily compensated by acting on the water pressure.

The porous wall (8) may be realised in several ways, but it is apparent that, contrarily to the graphitic elements for matter exchange between fuel cells and cooling cells described in US 2001/0004501 or in DE 10103568, this is a real structural element that must at least partially withstand the pressure unbalance between the two compartments interested to the water passage, which may be of several atmospheres.

Figure 3:
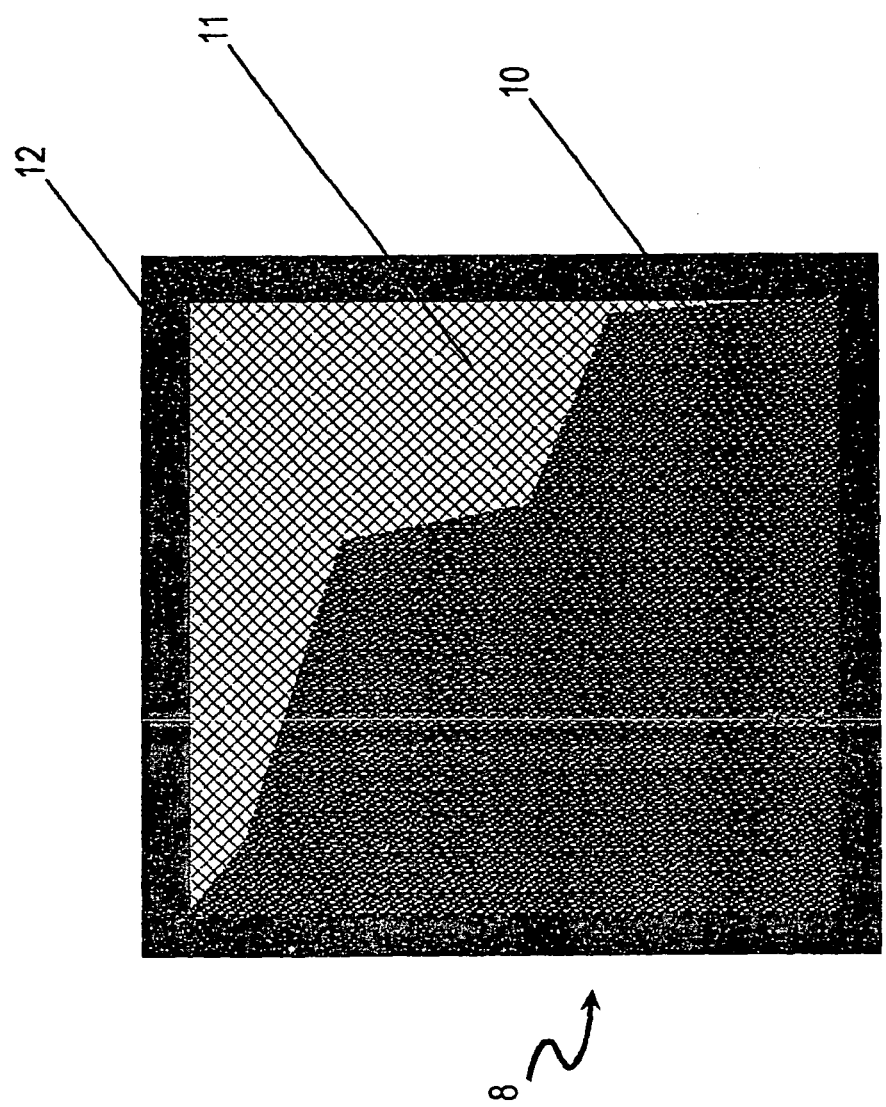
FIG. 3 shows a preferred embodiment of the metallic porous wall which separates the cooling cells from the membrane fuel cells of the electrochemical generator of the invention.

FIG. 3 offers therefore a preferred solution for the realisation of such component, although many other solutions will be feasible as evident to those skilled in the art. In the specific case illustrated, the controlled porosity material (10) which constitutes the critical component of the porous wall (8) is supported by a metal mesh (11) imparting mechanical stability thereto; as a further reinforcing element, a peripheral frame (12) is provided, which may also advantageously co-operate with the means for hydraulic seal (for example gaskets (4) of FIG. 1), which would give a more problematic coupling with a porous material. The controlled porosity material (10) may consist of a metal fibre interlacement, or even more preferably by a sintered material. The way of producing metal fibre or sintered composites of highly controlled porosity is widely known in the art, as are known the techniques for supporting the same on other metallic materials such as meshes, perforated or expanded sheets or equivalents. The porous wall (8) thus obtained may be optionally modified with hydrophobic material, on both sides or also on the sole gas side (face in contact with the distributor (6)), to allow a better control of the water flux. The hydrophobic material may consist, in a preferred embodiment, of a fluorinated polymer.

The porosity of the wall (8) must be preferably very fine; in order to successfully practice the method of the invention, the resistance to the passage of fluids or pressure drop across the same must be substantially higher than that imposed by the reticulated materials (6) and (6'), so that the water transport along the direction of the arrows (100) can be effectively controlled without interfering With the prevalent gas circulation within the reticulated distributor (6) (according to arrows (301) and (302)) and of the water itself within the reticulated material 6') (according to (201) and (202)).

The above description will not be intended as limiting the invention, which may be practiced according to different embodiments without departing from the scopes thereof, and whose extent is univocally defined by the appended claims. In the description and the claims of the present application, the word "comprise" and variations thereof such as "comprising" and "comprises" are not intended to exclude the presence of other elements or additional components.

The invention claimed is:

1. An electrochemical generator, comprising:
    at least one membrane fuel cell and at least one cooling cell interposed between two bipolar plates,
    wherein said at least one membrane fuel cell comprises a cathode compartment having a reticulated reactant gas distributor and an anode compartment having a reticulated reactant gas distributor,
    wherein at least one gaseous reactant passes through said anode compartment and at least one other gaseous reactant passes through said cathode compartment,
    said at least one cooling cell is interposed between said at least one membrane fuel cell and one of the bipolar plates, and is separated from said cathode compartment or said anode compartment of said at least one membrane fuel cell by a porous wall, and
    liquid water passes from said at least one cooling cell to said anode or cathode compartment of said at least one membrane fuel cell across said porous wall.

2. The generator of claim 1, wherein said at least one cooling cell is adjacent to either said anode compartment or said cathode compartment of said at least one membrane fuel cell.

3. The generator of claim 1, wherein said porous wall comprises a sintered metallic material or a metal fiber interlacement, optionally supported on a metal mesh or on an expanded or perforated sheet.

4. The generator of claim 1, wherein said porous wall comprises a peripheral sealing frame.

5. The generator of claim 1, wherein at least one side of said porous wall is coated with a hydrophobic material.

6. The generator of claim 5, wherein said hydrophobic material is a fluorinated polymer.

7. The generator of claim 1, wherein said reticulated gaseous reactant distributor has a fluid passage resistance substantially lower than that of said porous wall.

8. The generator of claim 1, wherein said reticulated gaseous reactant distributor is a piece of metal sponge, a piece of metal foam, a mesh, an expanded or perforated sheet, or a combination thereof.

9. The generator of claim 1, wherein said reticulated gaseous reactant distributor is made of metal.

10. The generator of claim 9, wherein said metal is selected from the group consisting of stainless steel, nickel, and nickel alloys.

11. The generator of claim 1, wherein said at least one cooling cell comprises a conductive reticulated element.

12. The generator of claim 11, wherein said conductive reticulated element of said at least one cooling cell has a fluid passage resistance substantially lower than that of said porous wall.

13. The generator of claim 11, wherein said reticulated gaseous reactant distributor is a piece of metal sponge, a piece of foam, a piece of mesh, an expanded or perforated sheet, or a combination thereof.

14. The generator of claim 11, wherein said conductive reticulated element of said at least one cooling cell is metallic, and optionally consisting of stainless steel, nickel or nickel alloy.

15. A method for generating direct electric current using said electrochemical generator of claim 1, comprising:
 supplying a water flow to said at least one cooling cell at a pressure higher than that of said at least one gaseous reactant in said anode or said cathode compartment said at least one cooling cell is adjacent to; and
 allowing said water flow to permeate from said at least one cooling cell to said adjacent anode or cathode compartment in said membrane fuel cell across said porous wall and humidifies said paseous reactant therein.

16. The method of claim 15, wherein the gaseous reactant humidified by said flow of water permeating across said porous wall is oxygen.

17. The method of claim 15, wherein both gaseous reactants are humidified by said flow of water permeating across said porous wall.

18. The method of claim 15, wherein said flow of water is preheated.

* * * * *

UNITED STATES PATENT AND TRADEMARK OFFICE
CERTIFICATE OF CORRECTION

PATENT NO. : 7,396,602 B2  Page 1 of 1
APPLICATION NO. : 10/536561
DATED : July 8, 2008
INVENTOR(S) : Antonino Toro It is certified that error appears in the above-identified patent and that said Letters Patent is hereby corrected as shown below:

Claim 15, col. 8, line 18, "paseous" should read --gaseous--.

Signed and Sealed this

First Day of September, 2009

David J. Kappos
*Director of the United States Patent and Trademark Office*